(12) United States Patent
Shoub

(10) Patent No.: US 7,084,778 B2
(45) Date of Patent: Aug. 1, 2006

(54) AMMONIA FLOW ALARM AND METHOD THEREFOR

(76) Inventor: Marcus Shoub, 5223 N. 24th St., Unit 103, Phoenix, AZ (US) 85016

( * ) Notice: Subject to any disclaimer, the term of this patent is extended or adjusted under 35 U.S.C. 154(b) by 30 days.

(21) Appl. No.: 10/428,797

(22) Filed: May 2, 2003

(65) Prior Publication Data

US 2004/0217871 A1 Nov. 4, 2004

(51) Int. Cl.
*G08B 17/10* (2006.01)
(52) U.S. Cl. ............... 340/632; 340/606; 340/607; 340/608; 73/240.11; 73/204.19; 73/204.25
(58) Field of Classification Search .......... 340/606, 340/608, 607, 632; 73/204.11, 204.19, 204.25
See application file for complete search history.

(56) References Cited

U.S. PATENT DOCUMENTS 4,922,233 A * 5/1990 Twerdochlib ............ 340/606
6,474,155 B1 * 11/2002 Berkcan et al. ......... 73/204.23

* cited by examiner

*Primary Examiner*—Julie Bichngoc Lieu
(74) *Attorney, Agent, or Firm*—Jeffrey D. Moy; Harry M. Weiss; Weiss & Moy, P.C.

(57) ABSTRACT

A sensor system for monitoring cryogenic gas flow through a tube/pipe has at least one sensor coupled to the tube/piping. An alarm circuit is coupled to the sensor for receiving measurement signals from the at least one sensor and for sending an alarm signal when the measurement signal deviates from a predetermined level.

15 Claims, 4 Drawing Sheets

AMMONIA FLOW ALARM AND METHOD THEREFOR

BACKGROUND OF THE INVENTION

1. Field of the Invention

This invention relates generally to an alarm system and, more specifically, to a non-intrusive ammonia flow alarm system which will signal when ammonia gas is flowing through a designated pipe.

2. Description of the Prior Art

Ammonia is a hazardous material which is normally a gas at room temperature and pressure. Ammonia is often transported in pipes in a liquid phase. Ammonia is generally transported from a gas cylinder through one or more pipes to a desired location. The ammonia is maintained in a liquid form by virtue of the pumping pressure. The ammonia gas may be used in a variety of different applications. For example, the ammonia gas may be used in the production of fertilizer, in a refrigeration process, and the like.

On certain size ammonia canisters, a release valve is required. The release valve is necessary to relieve pressure from the ammonia canister. The release valve is generally coupled to a pipeline and further to a diffusion tank which will capture the released ammonia gas.

When the ammonia gas is released through the released valve, it generally indicates that there is a problem with the ammonia cannister or the release valve. Thus, one needs to check the ammonia cannister and the release valve to see if there is a potential problem. For example, the release valve may have malfunctioned and is leaking ammonia. Unfortunately, most ammonia sensors are extremely expensive to install. Furthermore, these sensors generally have to be installed when the ammonia system is being constructed. Present ammonia sensors cannot easily be retrofitted onto an existing system due to the invasive nature of the retrofit.

Therefore, a need existed to provide an improved ammonia flow detection system. The improved ammonia flow detection system must overcome the problems associated with prior art systems. The improved ammonia flow detection system must be inexpensive and easy to install. The improved ammonia flow detection system must further be able to be retrofitted onto existing systems preferably in a non-invasive way.

SUMMARY OF THE INVENTION

In accordance with one embodiment of the present invention, it is an object of the present invention to provide an improved ammonia flow detection system.

It is another object of the present invention to provide an improved ammonia flow detection system that is able to overcome the problems associated with prior art gas flow detection systems.

It is still another object of the present invention to provide an improved ammonia flow detection system that is inexpensive and easy to install.

It is yet another object of the present invention to provide an improved ammonia flow detection system that is able to be retrofitted onto existing systems preferably in a non-invasive way.

BRIEF DESCRIPTION OF THE EMBODIMENTS

In accordance with one embodiment of the present invention, a sensor system for monitoring cryogenic gas flow through a tube/pipe is disclosed. The sensor system has at least one sensor coupled to the tube/piping. An alarm circuit is coupled to the sensor for receiving measurement signals from the at least one sensor and for sending an alarm signal when the measurement signal deviates from a predetermined level.

In accordance with another embodiment of the present invention, a sensor system for monitoring cryogenic gas flow through a tube/pipe is disclosed. The sensor system has at least one cryogenic gas flow sensor coupled to an exterior surface of a tube/pipe where the cryogenic gas will flow. The cryogenic gas flow sensor is used for measuring a temperature of the tube/pipe where the cryogenic gas will flow. A reference sensor is coupled to an empty tube/pipe where the cryogenic gas will not flow. The reference sensor is used for measuring a temperature of the empty tube/pipe. An alarm circuit is coupled to the sensors for receiving measurement signals from the sensors and for sending an alarm signal when the measurement signal deviates from a predetermined level. The alarm circuit has a plurality of input terminals wherein at least one input terminal is coupled to the at least one cryogenic gas flow sensor and wherein a second input terminal is coupled to a reference sensor. A comparator circuit is coupled to the plurality of input terminals for comparing an input signal of the at least one cryogenic gas flow sensor and an input signal of the reference sensor and for sending an output alarm signal when the difference between the input signal of the at least one cryogenic gas flow sensor and the input signal of the reference sensor deviates from a predetermined level.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
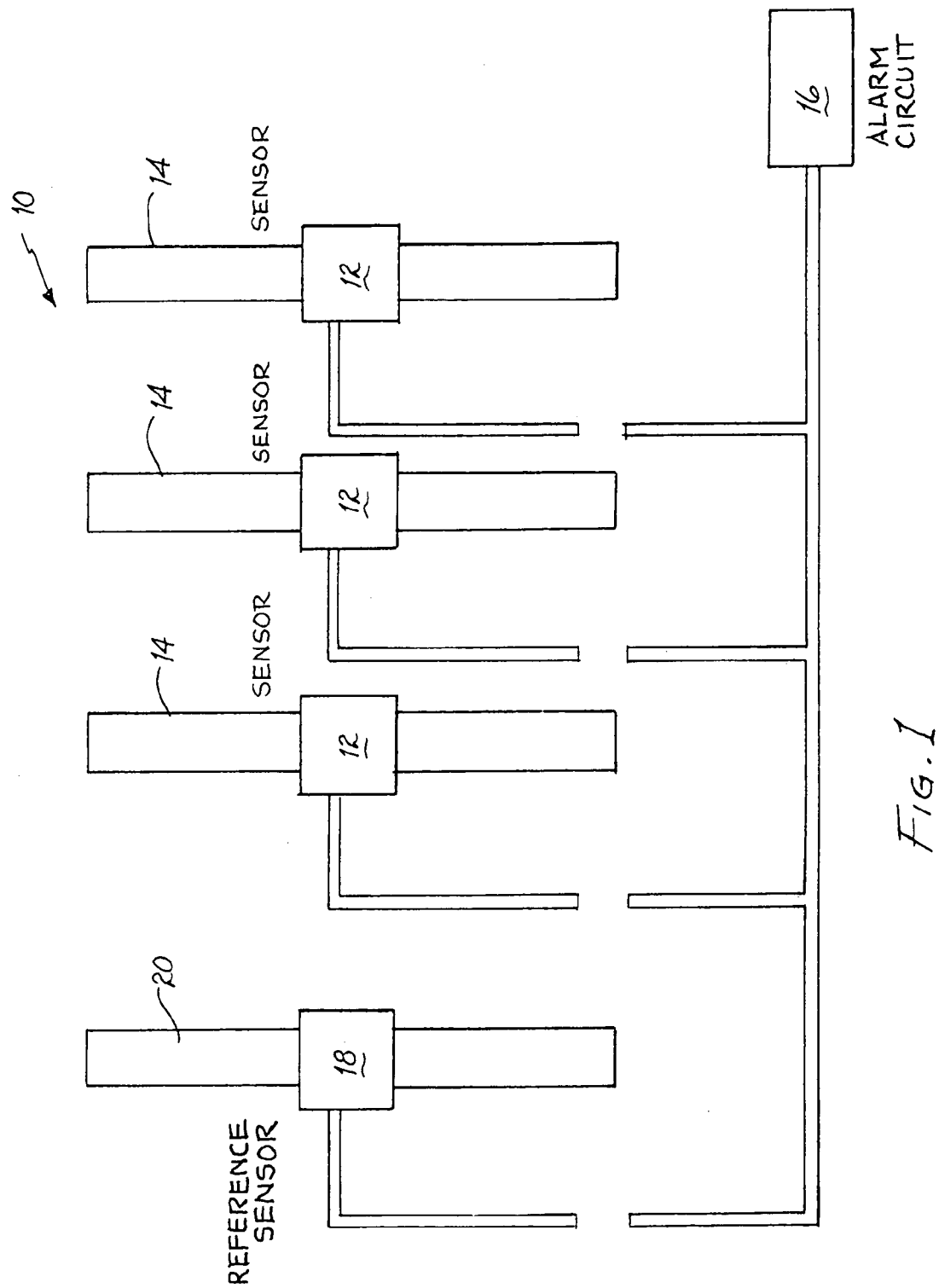
FIG. 1 is a simplified block diagram of the flow alarm system of the present invention.

Referring to FIG. 1, a cryogenic gas flow alarm system 10 (hereinafter system 10) is shown. The system 10 is used to detect the flow of cryogenic gases, such as ammonia, through piping of various sizes. The system 10 can be used to monitor the flow of different types of cryogenic gases. For example, the system 10 may be used to monitor the flow of liquid natural gas, liquid nitrogen, liquid oxygen, liquid propane, liquid ethylene, liquid propylene, liquid ammonia, and the like. The listing of the above should not be seen as to limit the scope of the present invention. The system 10 may be used to monitor the flow of any type of cryogenic gas.

The system 10 will have one or more sensors 12. The sensors 12 are coupled to the exterior of a pipe 14. The sensors 12 are used to measure the temperature of one or more pipes 14. When a cryogenic gas flows through the pipe 14, the temperature of the pipe 14 will drop. The sensor 12 can monitor the drop in temperature. The sensors 12 may be any one of numerous types of sensors. Any sensor 12 that is able to monitor a temperature may be used. For example, the sensor 12 may be a thermocouple, resistance temperature detectors (RTDs), thermistors, infra-red sensors, IC temperature sensors, molecular temperature switches, acoustic flow sensors, vibration flow sensors, ultrasonic flow sensors, fiber optic sensors, electrochemical sensors, and the like. The listing of the above sensors 12 should in no way be seen as to limit the scope of the present invention.

The sensor 12 is coupled to an alarm circuitry 16. The alarm circuitry 16 will monitor the temperature signals from the sensor 12. When the temperature drops below a predetermined temperature, the alarm circuitry 16 will sound off an alarm.

In order to prevent false alarm signals, a reference sensor 18 may be used. The reference sensor 18 may measure the air temperature or may be coupled to a reference pipe 20. The reference pipe 20 would generally be an empty pipe in which no cryogenic gas will flow. The reference sensor 18 is also coupled to the alarm circuitry 16. The alarm circuitry 16 can compare the temperature of the reference sensor 18 to that of the sensors 12 which are directly coupled to the exterior of the pipes 14. If the temperature difference between the reference sensor 18 and one of the sensors 12 deviates from a predetermined level, then the alarm circuitry 16 will signal an alarm.

Figure 2A:
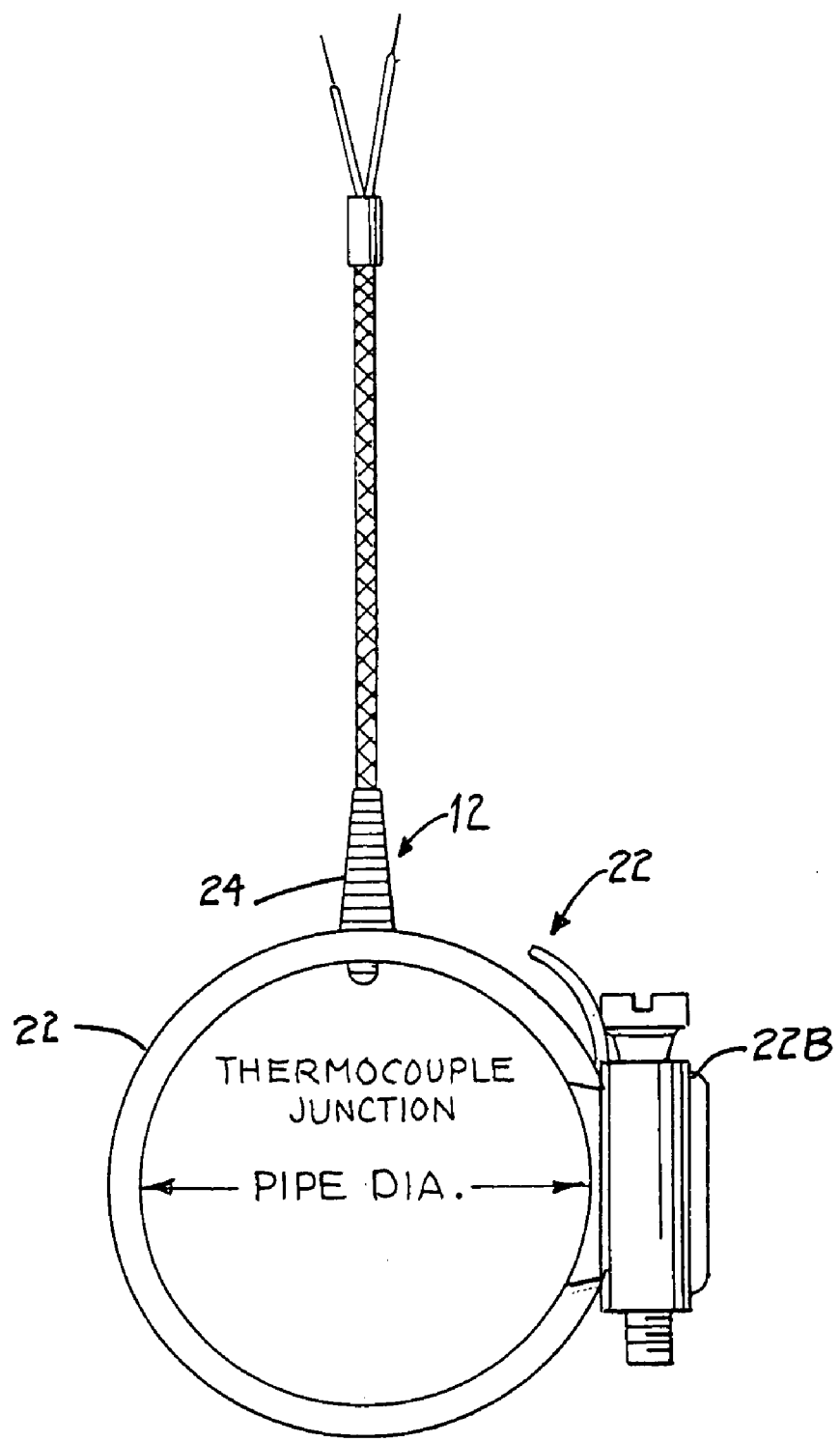
FIG. 2A is one embodiment of the sensor used in the flow alarm system of the present invention.

Referring now to FIG. 2A, one embodiment of the sensor 12 is shown. In this embodiment, the sensor 12 is a thermocouple sensor 12 which is coupled to the exterior of the pipe 14 with a clamping mechanism 22. The clamping mechanism 22 is similar to a hose clamp. The clamping mechanism 22 has a circular body member 22A. An opening is formed in the circular body member 22A. The opening is where a top section of the sensor 12 is inserted. The sensor 12 will thus be in contact with the pipe 14 when the clamping mechanism 22 is placed around the pipe 14 and tightened. The clamping mechanism 22 will have a locking member 22B coupled to the circular body member 22A. The locking member 22B will allow one to tighten the clamping mechanism 22 around the pipe 14.

In the embodiment depicted in FIG. 2A, the sensor 12 has a flexible membrane 24. The flexible membrane 24 will allow the sensor 14 to be better coupled to the pipe 14 and to allow the sensor 14 to adapt to the different conditions.

Figure 2B:
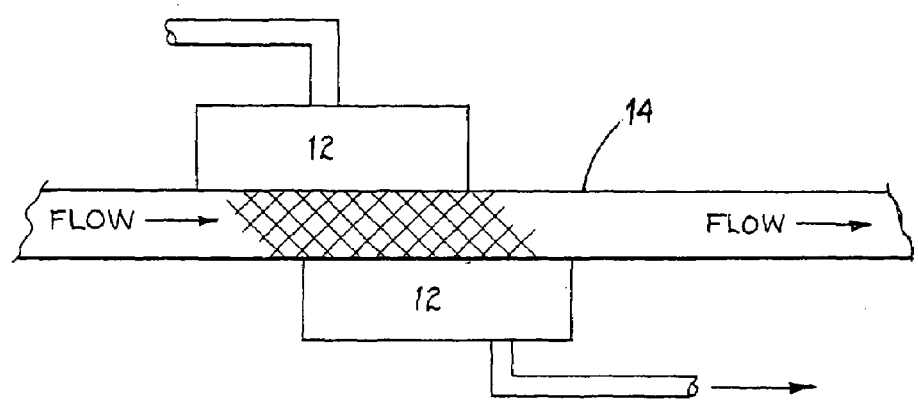
FIG. 2B is another embodiment of the sensor used in the flow alarm system of the present invention.
Figure 2C:
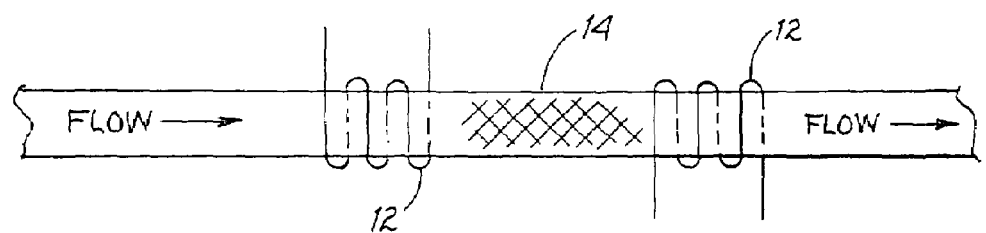
FIG. 2C is another embodiment of the sensor used in the flow alarm system of the present invention.

FIGS. 2B–2D show several different embodiments for the sensor 12 and the clamping mechanism 22. As shown in FIG. 2B, the sensor 12 may be directly coupled to the pipe 14. Some type of adhesive may be used to directly couple the sensor 12 to the pipe 14. Any type of adhesive ma be used as long as the adhesive does not interfere with the ability of the sensor 12 to monitor the temperature of the pipe 14. As may be seen in FIG. 2C, the sensor 12 may be wrapped around the pipe 14. In the embodiment no type of clamping mechanism 22 or adhesive is required. The sensor 12 is wrapped around the pipe 14 and the wires from the sensor 12 are then coupled to the alarm circuitry 16 holding the sensor in place. It should be noted that in order to increase the accuracy of the ability of the sensor 12 to monitor the temperature of the pipe 14, a gel may be used. The gel will help form a better connection between the sensor 12 and the pipe 14 thus leading to better readings.

Figure 3:
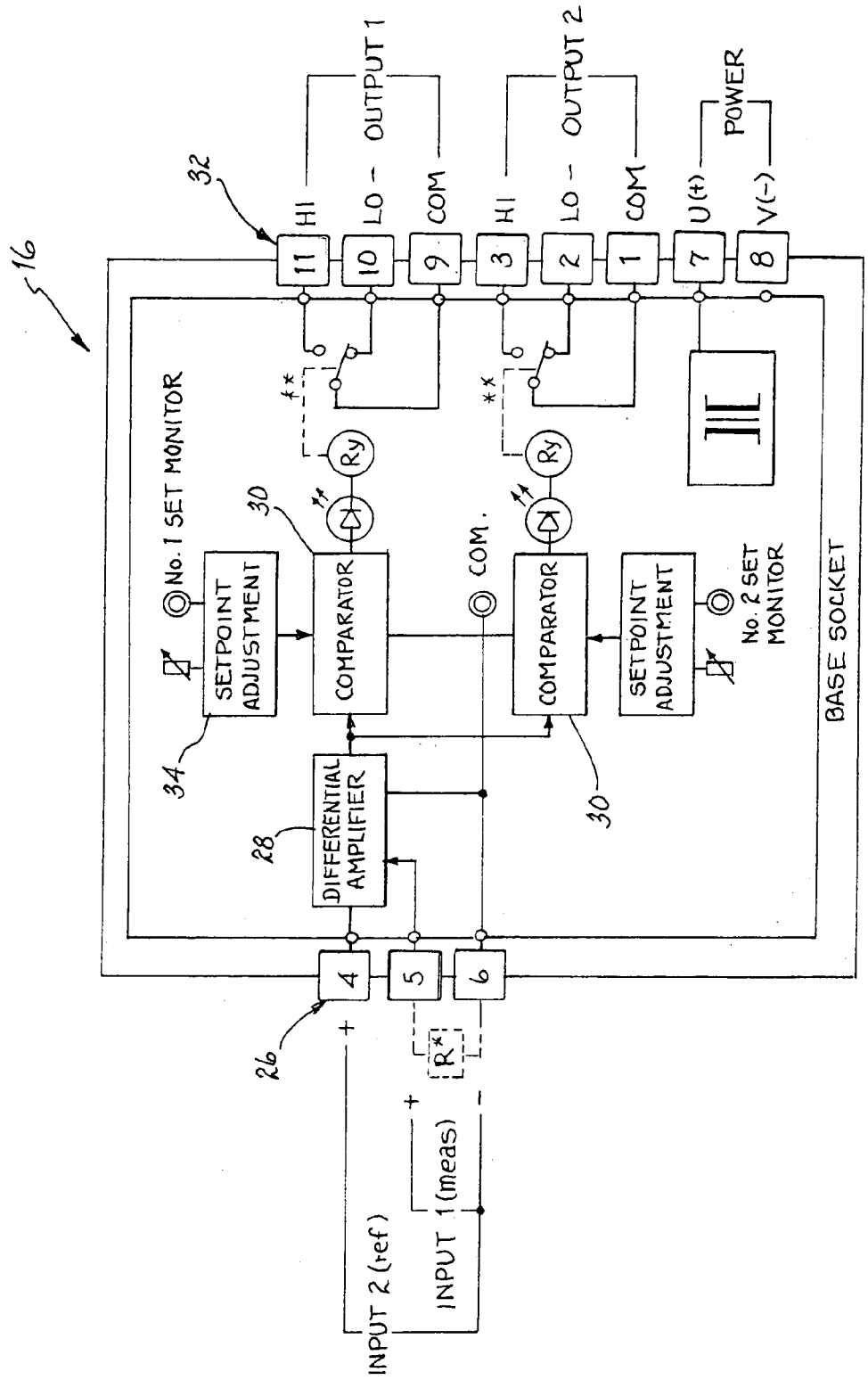
FIG. 3 is a simplified functional block diagram of the alarm circuitry used in the flow alarm system of the present invention.

Referring to FIG. 3, one embodiment of the alarm circuitry 16 is shown. The alarm circuitry 16 will have a plurality of input terminals 26. The input terminals 26 are used to couple the one or more sensors 12 and the reference sensor 18, if one is used) to the alarm circuitry 16. The input signals are then sent through a differential amplifier 28. The differential amplifier 28 will amplify the voltage difference between the input signals. The output from the differential amplifier 28 will then be sent to one or more comparators 30. Each comparator 30 is coupled to an output terminal 32. When the signal from the differential amplifier 28 deviates from a predetermined level, the comparator will send a signal to the output terminal 32. Each comparator 30 is coupled to a set-point adjustment 34. The set-point adjustment 34 will allow one to set the level at which the comparator 30 will send a signal to the output terminal 32. The output terminals 32 may be coupled to any type of alarm mechanism. For example, the output terminal may be coupled to an audible alarm (speaker system) or a visual alarm (lights). The output terminal 32 may further be coupled to a transmitter which will send a wireless communication to a remote device to indicate that the system 10 has monitored a cryogenic gas flow. The output terminals 32 may further be coupled to a relay switch. The relay switch may be used to shut down the cryogenic gas flow from the problem cannister.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A sensor system for monitoring cryogenic gas flow through a tube/pipe comprising:
at least one sensor coupled to the tube/piping, wherein the at least one sensor comprises:
at least one cryogenic gas flow sensor coupled to a tube/pipe where the cryogenic gas will flow for measuring a temperature of the tube/pipe where the cryogenic gas will flow; and
a reference sensor coupled to an empty tube/pipe where the cryogenic gas will not flow for measuring a temperature of the empty tube/pipe;
an alarm circuit coupled to the at least one cryogenic gas flow sensor and the reference sensor for receiving measurement signals from the at least one cryogenic gas flow sensor and the reference sensor and for sending an alarm signal when the difference between measurement signals from the at least one cryogenic gas flow sensor and the reference sensor deviates from a predetermined level.

2. A sensor system for monitoring cryogenic gas flow through a tube/pipe in accordance with claim 1 wherein the sensor is an external sensor coupled to an exterior surface of the tube/piping.

3. A sensor system for monitoring cryogenic gas flow through a tube/pipe in accordance with claim 1 wherein the alarm circuit comprises:
at least one input terminal coupled to the at least one sensor; and
comparator coupled to the input terminal for comparing the input signal to a predetermined level and for sending an output alarm signal when the input signal deviates from the predetermined level.

4. A sensor system for monitoring cryogenic gas flow through a tube/pipe in accordance with claim 1 wherein the alarm circuit comprises:
   a plurality of input terminals wherein at least one input terminal is coupled to the at least one cryogenic gas flow sensor and wherein a second input terminal is coupled to the reference sensor; and
   a comparator circuit coupled to the plurality of input terminals for comparing an input signal of the at least one cryogenic gas flow sensor and an input signal of the reference sensor and for sending an output alarm signal when the difference between the input signal of the at least one cryogenic gas flow sensor and the input signal of the reference sensor deviates from a predetermined level.

5. A sensor system for monitoring cryogenic gas flow through a tube/pipe in accordance with claim 4 wherein the comparator circuit comprises:
   a differential amplifier coupled to the plurality of input terminals;
   at least one comparator coupled to an output of the differential amplifier; and
   adjustment device coupled to the at least one comparator.

6. A sensor system for monitoring cryogenic gas flow through a tube/pipe in accordance with claim 4 further comprising a plurality of output terminals coupled to the comparator circuit for sending the output signal of the comparator circuit to an alarm device.

7. A sensor system for monitoring cryogenic gas flow through a tube/pipe in accordance with claim 6 wherein the alarm device is an audible alarm.

8. A sensor system for monitoring cryogenic gas flow through a tube/pipe in accordance with claim 6 wherein the alarm device is a visual alarm.

9. A sensor system for monitoring cryogenic gas flow through a tube/pipe in accordance with claim 6 wherein the alarm device is a remote alarm indicator device.

10. A sensor system for monitoring cryogenic gas flow through a tube/pipe comprising:
    at least one cryogenic gas flow sensor coupled to an exterior surface of a tube/pipe where the cryogenic gas will flow for measuring a temperature of the tube/pipe where the cryogenic gas will flow;
    a reference sensor coupled to an empty tube/pipe where the cryogenic gas will not flow for measuring a temperature of the empty tube/pipe; and
    an alarm circuit coupled to the sensor for receiving measurement signals from the at least one sensor and for sending an alarm signal when the measurement signal is above a predetermined level wherein the alarm circuit comprises:
       a plurality of input terminals wherein at least one input terminal is coupled to the at least one cryogenic gas flow sensor and wherein a second input terminal is coupled to a reference sensor; and
       a comparator circuit coupled to the plurality of input terminals for comparing an input signal of the at least one cryogenic gas flow sensor and an input signal of the reference sensor and for sending an output alarm signal when the difference between the input signal of the at least one cryogenic gas flow sensor and the input signal of the reference sensor deviates from a predetermined level.

11. A sensor system for monitoring cryogenic gas flow through a tube/pipe in accordance with claim 10 wherein the comparator circuit comprises:
    a differential amplifier coupled to the plurality of input terminals;
    at least one comparator coupled to an output of the differential amplifier; and
    adjustment device coupled to the at least one comparator.

12. A sensor system for monitoring cryogenic gas flow through a tube/pipe in accordance with claim 10 further comprising a plurality of output terminals coupled to the comparator circuit for sending the output signal of the comparator circuit to an alarm device.

13. A sensor system for monitoring cryogenic gas flow through a tube/pipe in accordance with claim 12 wherein the alarm device is an audible alarm.

14. A sensor system for monitoring cryogenic gas flow through a tube/pipe in accordance with claim 12 wherein the alarm device is a visual alarm.

15. A sensor system for monitoring cryogenic gas flow through a tube/pipe in accordance with claim 12 wherein the alarm device is a remote alarm indicator device.

* * * * *